United States Patent
Tang et al.

(10) Patent No.: US 9,577,293 B2
(45) Date of Patent: Feb. 21, 2017

(54) METHOD AND SYSTEM FOR EQUALIZING AND MATCHING LITHIUM SECONDARY BATTERIES

(71) Applicant: Guangzhou Fullriver Battery New Technology Co., Ltd., Guangzhou, Guangdong (CN)

(72) Inventors: Shengcheng Tang, Guangdong (CN); Shihua Zeng, Guangdong (CN); Dingbo Cheng, Guangdong (CN); Xiaoping Zeng, Guangdong (CN)

(73) Assignee: GUANGZHOU FULLRIVER BATTERY NEW TECHNOLOGY CO., LTD. (CN)

( * ) Notice: Subject to any disclaimer, the term of this patent is extended or adjusted under 35 U.S.C. 154(b) by 330 days.

(21) Appl. No.: 14/113,287

(22) PCT Filed: Nov. 8, 2012

(86) PCT No.: PCT/CN2012/001504
§ 371 (c)(1),
(2) Date: Oct. 22, 2013

(87) PCT Pub. No.: WO2013/097273
PCT Pub. Date: Jul. 4, 2013

(65) Prior Publication Data
US 2014/0167685 A1 Jun. 19, 2014

(30) Foreign Application Priority Data
Dec. 26, 2011 (CN) .......................... 2011 1 0439834

(51) Int. Cl.
G01N 27/416 (2006.01)
H01M 10/44 (2006.01)
H01M 10/42 (2006.01)
H02J 7/00 (2006.01)
H01M 10/052 (2010.01)

(52) U.S. Cl.
CPC ......... H01M 10/441 (2013.01); H01M 10/052 (2013.01); H01M 10/425 (2013.01); H01M 10/4207 (2013.01); H02J 7/0014 (2013.01); H01M 2010/4271 (2013.01); Y02E 60/122 (2013.01); Y10T 29/49004 (2015.01)

(58) Field of Classification Search
USPC ........................................................ 324/434
See application file for complete search history.

(56) References Cited

U.S. PATENT DOCUMENTS

2009/0102422 A1* 4/2009 Naganuma .......... B60L 11/1861
320/118

FOREIGN PATENT DOCUMENTS

| CN | 101286579 A | 10/2008 |
|---|---|---|
| CN | 101764259 A | 6/2010 |
| CN | 101814632 A | 8/2010 |

OTHER PUBLICATIONS

International Search Report for Application No. PCT/CN2012/001504 dated Feb. 21, 2013.

* cited by examiner

*Primary Examiner* — Robert Grant
(74) *Attorney, Agent, or Firm* — Heslin Rothenberg Farley & Mesiti P.C.

(57) ABSTRACT

In the present invention, a method and system for equalizing and matching lithium secondary batteries belong to the field of secondary batteries. A lithium secondary battery is divided into more than one grade according to the magnitude of a consumable current Ic, the number of grades is h, the lithium secondary battery is divided into grades corresponding to the consumable current according to the magnitude of a voltage difference $\Delta V$, a battery cell at a grade same as that of the consumable current and the voltage difference is selected for matching, so the range of the consumable current of the battery group can be controlled. The battery system configured in the method of the present invention converts consumable current grading into voltage difference grading after laying, so as to be convenient and swift; the range of the consumable current of the battery cell, the laying time, the equalization charging period, the equalization current, and the charger cutoff current are all under control, and are matched with each other, the equalization cost is low, and the charging equalization time is short; the laying service life and the maintenance period of the battery group can be designed or predicted during matching, and how many times of charging/discharging is required to charge the battery group to be balanced after the battery group is laid for an extremely long time is estimated in advance; the battery group reject rate is reduced, and the battery group reliability is improved.

8 Claims, No Drawings

METHOD AND SYSTEM FOR EQUALIZING AND MATCHING LITHIUM SECONDARY BATTERIES

TECHNICAL FIELD

The present invention, a method and system for equalizing and matching lithium secondary batteries, belongs to the field of secondary batteries. In particular, it relates to a matching method for lithium ion battery group, equalization protection board and charger, as well as the power supply system formed thereof.

BACKGROUND ART

There are a lot of patents and literatures currently available about the battery equalizing and matching, equalization of protection board, equalization of charger, and equalization of power supply system. A Chinese patent application with the Application No. 201110186716.1, introduced a consistency screening method for the lithium secondary batteries. Charging the battery to a low state of charge via the approach of multi-stage constant current and constant voltage, and laying for a suitable period of time, selecting the battery cell whose voltage is within a certain range to be used for the battery group matching. However, no matter how the battery cells are selected, two batteries always have some difference between them. So, if the requirement for consistency is set too high, the pass rate of the battery available for matching will be low; while if the requirement for consistency is set too low, the reliability of the matched battery group will be low. So, it needs to weigh the choices between the two factors.

Currently, the control parameters for the grade dividing and group matching of battery cell comprise capacity, voltage, internal resistance, and etc. In regard to the control for battery self-consumption, it usually set the state of charge of battery cells as full charge SOC 100% or half charge SOC 50%, and then lay them at room temperature or at 45~50° C. for a pre-determined period of time, and the battery cells with the voltage greater than or equal to the pre-determined standard value are the qualified. Alternatively, dividing the grade based on the voltage, i.e., measure the battery cell voltage and then divide the grade accordingly. The grade dividing based on the voltage has a certain degree of control to the level of battery self-consumption. However, due to the fact that after charging or discharging, the voltages of various battery cells are different themselves, which is because of the difference of various battery cells and the difference of the test cabinet points. Since the voltages of the battery cells are different from themselves, the grade dividing based on the voltage cannot accurately divide the grades according to the battery self-consumption.

Among the currently available battery self-consumption testing and sorting system, some of them accomplish the grade dividing via the voltage difference; i.e., after measuring the battery voltage, lay it aside for a pre-set period of time, and then measure its voltage again, and based on the difference of the voltage before and after to conduct the grade dividing. Such grade dividing based on the voltage difference is a progress from the grade dividing that is based on the voltage. However, due to the facts that the battery cells from different grades of voltage difference usually have different self-consumption or consumable current (or sometimes called self-discharge current); and sometimes such difference is quite large, the magnitude of the consumable current and the range of the consumable current of individual battery cell are actually unknown. So, it cannot design and clearly control battery group's laying service life. The standard method for measure the self-consumption is, according to the national or industry standard, measuring the charge retention capability of a battery. After the standard charging and discharging for 1 week with the battery or battery measure out the standard capacity $C_5$, next perform standard charging, and then under the condition of the environmental temperature at 23° C.±2° C., lay it aside as open circuit for 28 days, next discharge it with 0.2 $C_5$ mA to the cut-off voltage, and measure out the capacity after the laying $C_5'$, so the charge retention capability=$C_5'/C_5 \times 100\%$. The lost part is the self-consumption rate=$(C_5-C_5')/C_5 \times 100\%$. In the industry, the processes of battery shelving, storing and assembling are usually operated at the state of full charge or half charge. Within the range of SOC 50~100% the voltage changes of certain types of batteries are quite insignificant, such as the fully charged 10 Ah lithium iron phosphate-graphite battery, following charging, its open circuit stable voltage is 3.338 V, then discharging for 1 h with 1 A, 1 Ah has been discharged, the SOC is 90% and the open circuit stable voltage changes to 3.334 V; then discharge it again with 1 A, and another 1 Ah has been discharged, SOC becomes 80% and its open circuit stable voltage changes to 3.332 V. Although the currently available voltage measurement technology is able to measure with the accuracy up to 0.1 mV, or even higher accuracy; as for the large scale production in the factory, the environmental temperature, air direction from the conditioner, pressure of the measurement probe, the contacting position, and etc, may all influence the measurement accuracy for the voltage. Or the values shown in the measurement keep randomly changing, which makes it hardly can be determined manually; even for a machine, it can only made the determination randomly. So, the actual accuracy may be just at 0.1~1 mV.

In the battery group, there are always some differences of the consumable current between individual battery cells. During the processes of storing, shelving, placing, and using, due to the difference of the consumable current, the consistency among the individual battery cells, in particular the state of charge (SOC), keeps changing, and such difference gradually becomes bigger. Thus over a period of time, the battery group is going to fail. A battery group needs to be equipped with the equalization protection board. During the process of charging, it makes the states of charge of various individual battery cells become consistent. In the case when the equalization current of the equalization protection board does not match the range of the consumable current of the battery cells, and the range of the consumable current of the battery cell is too large, during charging process, it cannot make the states of charge of various individual battery cells become consistent within a reasonable period of time. In addition, if the charger does not match the equalization capability of the equalization protection board, and the charging cut-off current is much larger than the equalization current of equalization protection board, then in such a case, when the equalization is just started or even has not started yet, the charging is already terminated, then during the process of charging, it cannot make the states of charge of various individual battery cells become consistent, either.

There are mainly two equalization methods currently available. One method is the passive equalization, which only functions during the charging process. When a certain battery cell reaches the equalization initiation voltage, a part of the current will be leaked via a bypass resistor, thus to reduce the charging speed of the battery cell of a high voltage, and allow it to wait for the voltage increase of the battery cell of a low voltage. During the equalization process, it will generate heat; and its equalization efficiency is low. Yet its main advantage is the low price tag. This is the widely utilized equalization method. The other one is the active equalization method. It extracts energy from the battery cell with a high voltage via an inductance coil, and then transports it to the battery cell with a low voltage. Thus it has a very small energy loss; and generates almost no heat; as well as has a high equalization efficiency. This is a very good equality method. Nevertheless, its equalization cost is too high, which could be 3~5 fold of that of the passive equalization method.

The currently available equalizing and matching methods for the lithium secondary battery have certain drawbacks. They cannot ensure that the range of the consumable current of the battery cell within a controllable range; and cannot make a relational design of the range of the consumable current of the battery cells, the equalization current of the equalization protection board and the charging cut-off current of the charger; and also cannot effectively control the laying service life of a battery group.

SUMMARY OF INVENTION

The objective of the present invention is to address the technical difficulties of the currently available technology, and provide a method for equalizing and matching lithium secondary battery with a low utilization cost.

The objective of the present invention is to address the technical difficulties of the currently available technology, and provide a system for equalizing and matching lithium secondary battery of a low utilization cost.

Studies have been conducted on the battery group with no equalization protection board for the impacts of the difference of the consumable current, laying time, capacity difference, internal resistance difference, difference of the constant charging current ratio, to the charging and discharging performances of the battery group. It has been found that the difference of consumable current and laying time are the major impact factors. And the impact from the difference of capacity is the next to those two factors. While the impacts from the difference of internal resistance and from the difference of constant charging current ratio, are relatively small. One of the most common reasons of battery group failure is that the voltage of a certain battery cell in the battery group becomes too low or even close to the zero voltage. When testing the consumable current of the battery cells in the same battery group, the consumable current of that battery cell with low voltage is relatively large. During our studies about the relationship between the battery group laying service life and the range of the consumable current of the battery cells, the obtained result has been summarized in Table 1 below.

TABLE 1

Battery Group Laying Service Life and Range of Consumable Current

| Laying Service Life $T_g$ (Year) | Range of Consumable Rate (%) 28 d | Range of Consumable Current $\Delta I_c$ (mA) | 30 day Range of Consumable Capacity (mAh) at Full Charge | 90 day Range of Consumable Capacity (mAh) at Full Charge |
|---|---|---|---|---|
| 0.077 | 20 | 0.0002976 $C_5$ | 0.214272 $C_5$ | 0.642816 $C_5$ |
| 0.102 | 15 | 0.0002232 $C_5$ | 0.1607041 $C_5$ | 0.482112 $C_5$ |

TABLE 1-continued

Battery Group Laying Service Life and Range of Consumable Current

| Laying Service Life $T_g$ (Year) | Range of Consumable Rate (%) 28 d | Range of Consumable Current $\Delta I_c$ (mA) | 30 day Range of Consumable Capacity (mAh) at Full Charge | 90 day Range of Consumable Capacity (mAh) at Full Charge |
|---|---|---|---|---|
| 0.13 | 12 | 0.0001785 $C_5$ | 0.128520 $C_5$ | 0.385560 $C_5$ |
| 0.17 | 9 | 0.0001339 $C_5$ | 0.096408 $C_5$ | 0.289224 $C_5$ |
| 0.25 | 6 | 0.0000892 $C_5$ | 0.064224 $C_5$ | 0.192672 $C_5$ |
| 0.5 | 3 | 0.0000446 $C_5$ | 0.032112 $C_5$ | 0.096336 $C_5$ |
| 1 | 1.5 | 0.0000223 $C_5$ | 0.016056 $C_5$ | 0.048168 $C_5$ |
| 1.5 | 1 | 0.0000148 $C_5$ | 0.010656 $C_5$ | 0.031968 $C_5$ |
| 2 | 0.75 | 0.0000111 $C_5$ | 0.007992 $C_5$ | 0.023976 $C_5$ |
| 3 | 0.5 | 0.0000074 $C_5$ | 0.005328 $C_5$ | 0.015984$C_5$ |

SYMBOLS AND TERMS $T_g$—laying service life: after fully charged, a battery group is laid aside, due to the range of consumable current, differences are generated of the charge capacity of the respective battery cells, until the difference of capacity is greater than the total laying time of $0.2C_5$. The method for calculation is:

$$T_g = 0.2 C_5/(\Delta I_c * 24 * 365) \text{ unit: year } (y)$$

In turn, in order to ensure the laying Service life with the full charge state, the range of consumable current needs to be controlled for the battery group matching is:

$$\Delta I_c = 0.2 C_5/(T_g * 24 * 365) \text{ unit: mA}$$

$C_5$—the rated capacity of battery cell, unit mAh. It is the power should be provided of the discharge at the rate of 5 h till the termination voltage. When the capacity of a particular battery cell is mentioned, $C_5$ stands for the standard capacity discharged by that battery cell according to the rate of 5 h.

$C_5'$—at the condition of room temperature, the retained capacity after 28 days of open circuit storage of the standard charged single battery cell or battery group, unit is mAh.

$\rho$—self consumption rate: at the condition of room temperature, the proportion of the lost capacity ($C_5$-$C_5'$) after 28 days of open circuit storage of the standard charged single battery cell or battery group over the discharged capacity $C_5$ from the standard discharge. It has no unit. It could be referred as self consumption.

$$\rho = (C_5 - C_5')/C_5 * 100\%$$

$\rho$ min—the minimal self consumption rate: it is the self consumption rate at the full charge state of the battery cell with the smallest self consumption rate at the full charge state in the same battery group. It has no unit.

$\rho$ max—the maximal self consumption rate: it is the self consumption rate at the full charge state of the battery cell with the largest self consumption rate at the full charge state in the same battery group. It has no unit.

$I_c$—consumable current (or called self-discharge current), unit mA. The consumable current calculated based on the measured self consumption rate of a battery cell with full charge being laid aside for 28 days at room temperature. It is measured at the state of full charge, thus it is sometimes called the full charge state consumable current.

$$I_c = C_5 * \rho/(24 * 28)$$

$I_{cs}$—the set consumable current standard. Its unit is mA.
W—coefficient of consumable current grade dividing, no unit.

h—number of grade of the consumable current grade dividing, no unit.

h'—any grade of the consumable current dividing grade, unit grade. h'=(0, h] natural numbers.

Icmax—the consumable current of the battery cell that has the largest consumable current in the same battery group. Its unit is mA. It stands for the upper limit of the consumable current grade dividing, during the process of consumable current grade dividing and matching.

$$Ic\max=C_5*\rho\max/(24*28)$$

Icmin—the consumable current of the battery cell that has the smallest consumable current in the same battery group. Its unit is mA. It stands for the lower limit of the consumable current dividing grade, during the process of consumable current grade dividing and matching.

$$Ic\min=C_5*\rho\min/(24*28)$$

$\Delta$ Ic—range of the consumable current. Its unit is mA. The consumable currents measured in 28 days at the state of full charge and at room temperature, of the battery cells in the same battery group. Then calculate the respective consumable currents. The range of the consumable current is the difference between the max value and the min value. It stands for the difference of the upper limit of the consumable current grade dividing and the lower limit of the consumable current grade dividing, during the consumable current grade dividing and matching. The battery cells within the same grade of the consumable current dividing will be selected for matching. The range of consumable currents of a particular battery group matched according this method is less than or equal to the difference of the upper limit and the lower limit of the consumable current of the battery cells that are within the same grade.

$$\Delta Ic=Ic\max-Ic\min$$

C—battery cell capacity. It is the measured respective battery cell capacity after it has been measured separately. Its unit is mAh.

Cs—the set capacity standard, unit mAh.

X—coefficient of capacity grade dividing, no unit.

i—grade number of the capacity grade dividing, unit grade.

R—internal resistance. It is the internal resistance of the battery cell. Its unit is ma Rs—the set internal resistance standard. Its unit is m$\Omega$.

Y—coefficient of internal resistance grade dividing. It has no unit.

j—grade number of the internal resistance grade dividing, unit grade.

Cc—ratio of constant current: after the battery cells have been discharged according to the industry standard, it is next fully charged with constant current and constant voltage according to the industry standard. It is the ratio of the capacity being charged with the constant current over the total capacity being charged with the constant current and constant voltage. It has no unit.

Ccs—the set constant current ratio standard. It has no unit.

Z—coefficient of ratio of constant current grade dividing. It has no unit.

k—grade number of the ratio of constant current grade dividing, unit grade.

Vc—the voltage value of the charge at the fixed voltage point. Its unit is mV. It stands for the set charging voltage value at the voltage sensitive region of the discharge curve.

V0—the stable voltage after the fixed voltage charge. Its unit is mV. After the fixed voltage charge, it is laid aside as the open circuit, the voltage will be tested and recorded for every hour. If the difference of the values from two consecutive testing is less than 1 mV, then it will be considered as the stable voltage.

Vt—the voltage after the laying of a set laying time period post the fixed voltage charging. Its unit is mV.

V7—the voltage after the laying for 7 days post the fixed voltage charge. Its unit is mV.

$\Delta$V—voltage difference; and its unit is mV. The difference of the stable voltage V0 after the fixed voltage charge and the voltage Vt after the laying of time t post the fixed voltage charge.

$$\Delta V=V0-Vt$$

V1—via the equation of Ic-$\Delta$V, the obtained voltage difference corresponding to Ics. Its unit is mV.

V2, V3—via the equation of Ic-$\Delta$V, the voltage difference grade corresponding to h' WIcs. Its unit is mV.

Ib—the equalization current of the equalization protection board. Its unit is mA.

Icut—the cut-off current of the constant voltage charge by a charger. Its unit is mA.

Tb—equalization time; its unit is h. Due to the difference of the consumable current $\Delta$ Ic of the battery group, after laying for a time period of T1, the generated SOC difference between individual battery cells. It needs to make up the SOC difference via the equalization current. And Tb is the needed time for such make up. It is the total equalization time needed for making up the range of capacity after laying aside. And it is the total equalization time of the needed many times of equalizations, rather than the total time needed for one time of charge.

$$Tb=\Delta Ic*T1/Ib$$

n—number of the series connected individual battery cells in a battery group.

T1—laying time. Its unit is h. It comprises the time period for transportation, storage, for sale and placement.

SOC—state of charge. 0$\leq$SOC$\leq$1.

t—battery cell laying time: it stands for the laying time as open circuit after the battery cell fixed voltage point charge. Its unit is d.

Tm—maintenance period: it is also called as equalization charge period. Based on the equalization current and that usually the equalization time of a single charging is 0.5 h, in order to make up the range of capacity after the laying post full charge, it is the corresponding laying time. The equalization charge is to use the matched charger to charge the battery till the cut-off of the charger or of the protection board. It is not the cut off manually made in advance. If the laying time is longer that of the equalization charge period of time, it then needs many times of equalization charge and discharge in order to make up the range of the capacity after laying.

$$Tm=Ib*0.5h/(\Delta Ic*24h) \text{ unit: } d$$

Cm—battery group dynamic capacity: after being fully charged, along with the extension of the battery laying time, the usable capacity actually keeps changing.

$$Cm=C_5-Ic\max*T1$$

Voltage sensitive region: based on the characteristic of battery cell discharging, usually according to the 0.2 $C_5$ discharging feature, and select the voltage range with the large change of discharging voltage. Generally, the voltage section is selected with the range of SOC as more than 0.005, SOC change as 0.001, and the voltage change is greater than 3 mV, voltage range is over 30 mV. Such section can be found at the end of discharging of any type of lithium secondary battery. In certain systems, such as lithium nickel manganese cobalt oxide—hard carbon, such section can be found in the entire discharging process. The battery cell is set for laying in the voltage sensitive region, via the measurement of voltage difference, it is convenient to recognize the battery cells with different consumable current. With the selection of different voltage sensitive regions, or charging and discharging to the different voltage points in the voltage sensitive region, the fitted Ic-$\Delta V$ equation will be different.

The consumable current of the state of full charge is generally larger than the consumable current of the state of low charge. During the design, the consumable current of the state of full charge has been controlled in a relatively small range. At the same level of grade, during the laying period, most of them are in the state of full charge and are prepared for use. Long time of laying with the state of full charge can ensure the battery group have an appropriate laying service life. And at the state of low charge, the battery group's laying service life can be better ensured. The range of the consumable current of the battery cell can be selected and controlled. The equalization current of the equalization protection board can be designed and selected, and the cut-off current of the charger is also designable and selectable.

The present invention, a method for equalizing and matching lithium secondary battery is achieved via the steps set forth below:

In the present invention, the lithium secondary battery using the full charge state consumable current as the control standard, via a corresponding function relation, and using the voltage difference as the measurement control value, selecting a battery cell at a grade of the consumable current being the same as the grade of the voltage difference to conducting the matching;

In the present invention, the grade dividing for the lithium secondary battery, according the magnitude of the consumable current Ic dividing the battery cell into more than one grades, the number of grade being h, according the size of the voltage difference $\Delta V$ dividing the battery cell dividing the battery cell into grades that corresponding to the consumable current, selecting the battery cells that have the same grates of consumable current and voltage difference to conduct the matching, so the range of the consumable current of the battery group can be controlled;

Ic—consumable current, unit mA, the consumable current calculated based on the measured consumption rate of a battery cell at the state of full charge and being laid aside for 28 days at room temperature;

$\Delta V$—voltage difference; and its unit is mV. The difference of the stable voltage after the fixed voltage charge V0 and the voltage after the laying of time t post the fixed voltage charge Vt, $\Delta V = V0-Vt$;

V0—the stable voltage after the fixed voltage charge. Its unit is mV. After the fixed voltage charge, it is laid aside as the open circuit, the voltage will be tested and recorded for every hour. If the difference of the values from two consecutive testing is less than 1 mV, then it will be considered as the stable voltage;

Vt—the voltage after the laying of a set laying time period post the fixed voltage charging. Its unit is mV;

In the present invention, the grade dividing according to the consumable current, setting the qualified consumable current as Ics, and Ic≤Ics being the qualified, using WIcs as the grade span length, W=0.05~0.5, grade levels being (0, WIcs], (WIcs, 2 WIcs], (2WIcs, 3 WIcs], . . . ((h−1) WIcs, h WIcs], hW=1, number of grade h=1/W; Ics≤0.0002232C5, which being equal to that the battery cell with its consumption rate less than or equal to 15% as the consumable current qualified;

The same grade range of consumable current $\Delta Ic=WIcs$ $\Delta Ic$—range of consumable current, with the unit as mA, The consumable currents measured in 28 days at the state of full charge and at room temperature of the battery cells in the same battery group. Then calculate the respective consumable currents. The range of the consumable current is the difference between the max value and the min value;

Ics—the set consumable current standard, unit being mA;

W—coefficient of consumable current grade dividing, no unit;

h—grade number of consumable current grade dividing, no unit;

Ic—consumable current, unit mA, the consumable current being calculated based on the measured self-consumption rate of a battery cell with full charge being laid aside for 28 days at room temperature.

In the present invention, the grade dividing according to the voltage difference $\Delta V$, the battery cells being charged to a fixed point of voltage Vc within the selected voltage sensitive region with constant current and constant voltage, the battery cells being laid at room temperature for a time period t, then measuring a series of Ic values and $\Delta V$ values, determining the grades of voltage difference according to the divided grades of the range of consumable current $\Delta Ic$, battery cells laying time at the room temperature being 1~28 days;

In the present invention, the grade dividing according to the voltage difference $\Delta V$, the battery cells being charged to a fixed point of voltage Vc within the selected voltage sensitive region with constant current and constant voltage, the battery cells being laid with open circuit at room temperature, measuring and recording the voltage value once each hour, until the voltage difference between two consecutive measures being less than 1 mV, and using it as the battery cell laying initiation voltage V0, at room temperature laying a suitable time period t, t=1~28 days, measuring the voltage Vt again, and the $\Delta V$ after being laid for the time period t;

Measuring battery cells with different $\Delta V$, and its corresponding relationship with the consumable current at the state of full charge Ic, and then fitting the Ic-$\Delta V$ equation;

$$Ic=f(\Delta V)$$

Fitting it until the correlation coefficient $R^2 \geq 0.99$, so as to fit out the Ic-$\Delta V$ equation;

Charging battery cells with constant current and constant voltage to Vc, measuring and recording the stable voltage V0, laying time t, measuring and recording the voltage Vt, calculating the $\Delta V$;

$\Delta V=(0, V1]$ being battery consumable current qualified $\Delta V=(V2, V3]$ being battery consumable current at the same grade V1 being used to control the max consumption of the battery group, which is correspondent to Ics; V2, V3 being used to control the max range of consumable current of the battery cells in the battery group, which is correspondent to the consumable current grade dividing h' WIcs, h'=(0, h] natural number; in different grades, $\Delta V$, V2 and V3 can be different, selecting the battery cells with the same grade of their consumable currents to perform the matching, so as to control the range of consumable current of the battery group;

In the present invention, dividing the grades of battery capacity, and setting a qualified capacity Cs, C≥Cs being the qualified; Cs≥$C_5$, using XCs as the grade span length, $X=0.01\sim0.1$, grade levels being [Cs, (1+X) Cs), [(1+X) Cs, (1+2×) Cs), [(1+2X)Cs, (1+3X)Cs), . . . [(1+(i−1)X)Cs, (1+iX)Cs); number of grade i is related to the grade span length XCs and the size of the capacity distributions, generally $(1+iX) \le 1.5$, $iX \le 0.5$, $i \le 0.5/X$;

In the present invention, dividing the grades of internal resistance, and setting a qualified internal resistance Rs, $R \le Rs$ being the qualified; using YRs as the grade span length, $Y=0.05\sim0.5$, grade levels being (0, YRs], (YRs, 2YRs], (2YRs, 3YRs], . . . ((j−1) YRs, jYRs]; jY=1, the number of grade j=1/Y;

In the present invention, dividing the grades of constant current ratio, and setting a qualified constant current ratio Ccs, $Cc \ge Ccs$ being the qualified; using ZCcs as the grade span length, $Z=0.01\sim0.1$, grade levels being [Ccs, (1+Z) Ccs), [(1+Z) Ccs, (1+2Z)Ccs), [(1+2Z) Ccs, (1+3Z) Ccs), . . . [(1+(k−1)Z)Ccs, (1+kZ) Ccs), (1+kZ) Ccs≤1, k≤(1/Ccs−1)/Z, the number of grade being k;

Selecting the battery cells with consumable current and the voltage difference being qualified and in the same grade, capacity being qualified and in the same grade, internal resistance being qualified and in the same grade, ratio of constant current being qualified and in the same grade to perform the matching;

The present invention, a system for equalizing and matching lithium secondary battery, comprises lithium secondary battery group, equalization protection board, and charger. The lithium secondary battery uses the full charge state consumable current as the control standard, via a corresponding function relation, using the voltage difference as the measurement control value, selecting a battery cell at a grade of the consumable current being the same as the grade of the voltage difference to conducting the matching;

The grade dividing for the lithium secondary battery, according the magnitude of the consumable current Ic dividing the battery cell into more than one grades, the number of grade being h, according the size of the voltage difference $\Delta V$ dividing the battery cell dividing the battery cell into grades that corresponding to the consumable current, selecting the battery cells that have the same grates of consumable current and voltage difference to conduct the matching, so the range of the consumable current of the battery group can be controlled;

Ic—consumable current, unit mA, the consumable current calculated based on the measured consumption rate of a battery cell at the state of full charge and being laid aside for 28 days at room temperature;

$\Delta V$—voltage difference; and its unit is mV. The difference of the stable voltage after the fixed voltage charge V0 and the voltage after the laying of time t post the fixed voltage charge Vt, $\Delta V = V0 - Vt$;

V0—the stable voltage after the fixed voltage charge. Its unit is mV. After the fixed voltage charge, it is laid aside as the open circuit, the voltage will be tested and recorded for every hour. If the difference of the values from two consecutive testing is less than 1 mV, then it will be considered as the stable voltage;

Vt—the voltage after the laying of a set laying time period post the fixed voltage charging. Its unit is mV;

The grade dividing being according to the consumable current, setting the qualified consumable current as Ics, and $Ic \le Ics$ being the qualified, using WIcs as the grade span length, $W=0.05\sim0.5$, grade levels being (0, WIcs], (WIcs, 2 WIcs], (2WIcs, 3 WIcs], . . . ((h−1) WIcs, h WIcs], hW=1, number of grade h=1/W; $Ics \le 0.0002232C5$, which being equal to that the battery cell with its consumption rate less than or equal to 15% as the consumable current qualified;

The same grade range of consumable current $\Delta Ic = WIcs$ $\Delta Ic$—range of consumable current, with the unit as mA, The consumable currents measured in 28 days at the state of full charge and at room temperature of the battery cells in the same battery group. Then calculate the respective consumable currents. The range of the consumable current is the difference between the max value and the min value;

Ics—the set consumable current standard, unit being mA;

W—coefficient of consumable current grade dividing, no unit;

h—grade number of consumable current grade dividing, no unit;

Ic—consumable current, unit mA. The consumable current calculated based on the measured self-consumption rate of a battery cell with full charge being laid aside for 28 days at room temperature.

The grade dividing according to the voltage difference $\Delta V$, the battery cells being charged to a fixed point of voltage Vc within the selected voltage sensitive region with constant current and constant voltage, the battery cells being laid with open circuit at room temperature, measuring and recording the voltage value once each hour, until the voltage difference between two consecutive measures being less than 1 mV, and using it as the battery cell laying initiation voltage V0, at room temperature laying a suitable time period t, $t=1\sim28$ days, measuring the voltage Vt again, and the $\Delta V$ after being laid for the time period t;

Measuring battery cells with different $\Delta V$, and its corresponding relationship with the consumable current at the state of full charge Ic, and then fitting the Ic−$\Delta V$ equation;

$$Ic = f(\Delta V)$$

Fitting it until the correlation coefficient $R^2 \ge 0.99$, so as to fit out the Ic−$\Delta V$ equation;

Charging battery cells with constant current and constant voltage to Vc, measuring and recording the stable voltage V0, laying time t, measuring and recording the voltage Vt, calculating the $\Delta V$;

$\Delta V=(0, V1]$ being consumable current qualified $\Delta V=(V2, V3]$ being consumable current at the same grade V1 being used to control the max consumption of the battery group, which is correspondent to Ics; V2, V3 being used to control the max range of consumable current of the battery cells in the battery group, which is correspondent to the consumable current grade dividing h' WIcs, h'=(0, h] natural number; as for different $\Delta V$, V2 and V3 can be different, selecting the battery cells within the same grade of their consumable currents to perform the matching, so as to control the range of consumable current of the battery group;

The present invention, a system for equalizing and matching lithium secondary battery, comprises equalization protection board, the equalization current of the equalization protection board being 100~1000 fold of the range of consumable current used for the battery cell matching design, $Ib = 100 \Delta Ic \sim 1000 \Delta Ic$;

The present invention, a system for equalizing and matching lithium secondary battery, comprises charger, the charge cut-off current of the charger being 1~10 fold of the equalization current of the equalization protection board, $Icut = Ib \sim 10 Ib$.

The more of the divided grades for the battery cell grade dividing, the more difficult of the battery management, and the more difficult to find the battery cells that are with the same grade of consumable current, voltage difference, capacity, internal resistance, ratio of constant current, the success rate for battery matching would be low. So, it would be further optimized.

The grade dividing being according to the consumable current, setting the qualified consumable current as Ics, and Ic≤Ics being the qualified, using WIcs as the grade span length, W=0.2~0.3, grade levels being (0, WIcs], (WIcs, 2 WIcs], (2WIcs, 3 WIcs], ... ((h−1) WIcs, h WIcs], hW=1, number of grade h=1/W; Ics≤0.0002232C5, which being equal to that the battery cell with its consumption rate less than or equal to 15% as the consumable current qualified;

The same grade range of consumable current $\Delta Ic = WIcs$ $\Delta Ic$—range of consumable current, with the unit as mA, The consumable currents measured in 28 days at the state of full charge and at room temperature of the battery cells in the same battery group. Then calculate the respective consumable currents. The range of the consumable current is the difference between the max value and the min value.

Ics—the set consumable current standard, unit being mA;

W—coefficient of consumable current grade dividing, no unit;

h—grade number of consumable current grade dividing, no unit;

Ic—consumable current, unit mA. The consumable current calculated based on the measured self-consumption rate of a battery cell with full charge being laid aside for 28 days at room temperature;

In the present invention, the grade dividing according to the voltage difference $\Delta V$, the battery cells being charged to a fixed point of voltage Vc within the selected voltage sensitive region with constant current and constant voltage, the battery cells being laid at room temperature for a time period t, then measuring a series of Ic values and $\Delta V$ values, determining the grades of voltage difference according to the divided grades of the range of consumable current $\Delta Ic$, battery cells laying time at the room temperature being t=7 days;

In the present invention, the grade dividing according to the voltage difference $\Delta V$, the battery cells being charged to a fixed point of voltage Vc within the selected voltage sensitive region with constant current and constant voltage, the battery cells being laid with open circuit at room temperature, measuring and recording the voltage value for each hour, until the voltage difference between two consecutive measures being less than 1 mV, and using it as the battery cell laying initiation voltage V0, at room temperature laying a suitable time period t, t=7 days, measuring the voltage Vt again, and the $\Delta V$ after being laid for the time period t=7 days;

Measuring battery cells with different $\Delta V$, and its corresponding relationship with the consumable current at the state of full charge Ic, and then fitting the Ic–$\Delta V$ equation;

$Ic = f(\Delta V)$

Fitting it until the correlation coefficient $R^2 \geq 0.99$, so as to fit out the Ic–$\Delta V$ equation;

Charging battery cells with constant current and constant voltage to Vc, measuring and recording the stable voltage V0, laying time t, measuring and recording the voltage Vt, calculating the $\Delta V$;

$\Delta V = (0, V1]$ being consumable current qualified $\Delta V = (V2, V3]$ being consumable current at the same grade V1 being used to control the max consumption of the battery group, which is correspondent to Ics; V2, V3 being used to control the max range of consumable current of the battery cells in the battery group, which is correspondent to the consumable current grade dividing h' WIcs, h'=(0, h] natural number; as for different $\Delta V$, V2 and V3 can be different, selecting the battery cells with the same grade of their consumable currents to perform the matching, so as to control the range of consumable current of the battery group;

In the present invention, dividing the grades of battery capacity, and setting a qualified capacity Cs, C≥Cs being the qualified; Cs≥$C_5$, using XCs as the grade span length, X=0.02~0.05, grade levels being [Cs, (1+X) Cs), [(1+X) Cs, (1+2×) Cs), [(1+2X) Cs, (1+3×) Cs), ... [(1+(i−1) X)Cs, (1+iX) Cs); number of grade I is related to the grade span length XCs and the size of the capacity distributions, generally (1+iX)≤1.5, iX≤0.5, i≤0.5/X;

In the present invention, it being set that internal resistance is not divided for different grades, setting a qualified internal resistance Rs, R≤Rs being the qualified;

In the present invention, it being set that constant current ratio is not divided for different grades, setting a qualified constant current ratio Ccs, Cc≥Ccs being the qualified;

In the present invention, the equalization current of the equalization protection board being 200~500 fold of the range of consumable current used for the battery cell matching design, Ib=200 $\Delta Ic$~500 $\Delta Ic$;

In the present invention, the charge cut-off current of the charger being 2~5 fold of the equalization current of the equalization protection board, Icut=2 Ib~5 Ib.

The battery system configured in the method of the present invention converts consumable current grade dividing into voltage difference dividing after laying, so as to be convenient and swift; the range of the consumable current of the battery cell, the laying time, the equalization charging period, the equalization current, and the charger cutoff current are all under control, and are matched with each other, the equalization cost is low, and the charging equalization time is short; the laying service life and the maintenance period of the battery group can be designed or predicted during matching, and how many times of charging/discharging is required to charge the battery group to be balanced after the battery group is laid for an extremely long time is estimated in advance; the battery group reject rate is reduced, and the battery group reliability is improved.

DESCRIPTION OF EMBODIMENTS

In reference to the embodiments, the present invention will be further described in details.

The present invention, a method and system for equalizing and matching lithium secondary battery is achieved via the steps set forth below:

1. Battery Grade Dividing and Battery Matching 1.1 Grade dividing according to the consumable current and voltage difference: setting the qualified consumable current as Ics, and Ic≤Ics being the qualified. Ics≤0.0002232C5. which being equal to that the battery cell with its consumption rate less than or equal to 15% as the consumable current qualified; in order to ensure that the products comply with the industry standard, the company internal controls can be tightened. Using WIcs as the grade span length, W=0.05~0.5, grade levels being (0, WIcs], (WIcs, 2 WIcs], (2WIcs, 3 WIcs], ... ((h−1) WIcs, h WIcs], hW=1, number of grade h=1/W, the number of grade h is related to the size of the grade span length WIcs and of the distribution of the consumable current. Some grades set according to the theory may actually not exist in the reality.

The same grade range of consumable current $\Delta Ic = WIcs$

Can be determined based on the laying service life of the battery group. The longer the laying service life is required to be, the finer the grade dividing of consumable current should be.

The consumable current Ic and the grade dividing of consumable current are reflected by the voltage difference.

Select the voltage sensitive region with large voltage change in the discharge curve, then the battery cells are charged to a fixed point of voltage Vc within the selected voltage sensitive region with constant current and constant voltage, the battery cells being laid at room temperature for a time period t, then measuring a series of Ic values and $\Delta V$ values, fitting the Ic–$\Delta V$ equation, setting the qualified voltage difference and the grade levels of voltage difference. The battery cells laying time t at the room temperature is 1~28 days. Next determine the grades of voltage difference according to the divided grades of the range of consumable current $\Delta Ic$.

Example: in regard to lithium iron phosphate-graphite battery, the voltage sensitive region can be selected as 2~3.2 V, SOC 0~35%, and charge the battery to any voltage point in such voltage region, or discharge the battery to any voltage point in such voltage region. In regard to the lithium cobalt oxide—graphite battery, lithium manganese Oxide-graphite battery, lithium nickel manganese cobalt oxide-graphite battery, the voltage sensitive region can be selected as 2.5~3.7 V, SOC 0~20%, and charge the battery to any voltage point in such voltage region, or discharge the battery to any voltage point in such voltage region. In general, if the battery is charged to the section of high voltage section within the voltage sensitive region, the voltage will drop; if the battery is discharged to the section of lower voltage within the sensitive region, the voltage will then rise.

The specific approach is, the battery cells being charged to a fixed point of voltage Vc within the selected voltage sensitive region with constant current and constant voltage, the battery cells being laid with open circuit at room temperature, measuring and recording the voltage value once each hour, until the voltage difference between two consecutive measures being less than 1 mV, and using it as the battery cell laying initiation voltage V0, at room temperature laying a suitable time period t, t=1~28 days, measuring the voltage Vt again, and the $\Delta V$ after being laid for the time period t.

Measuring battery cells with different $\Delta V$, and its corresponding relationship with the consumable current at the state of full charge Ic, and then fitting the Ic–$\Delta V$ equation;

$$Ic=f(\Delta V)$$

The trend chart in excel can be utilized to conduct the fitting. Fitting it until the correlation coefficient $R^2 \geq 0.99$, the closer $R^2$ to 1, the better. When using the polynomial fitting, in general, the higher the selected order is, the closer the fitted correlation coefficient $R^2$ to 1; or other data processing technology can also be used for fitting the equation Ic=f($\Delta V$).

Due to the differences of the selected voltage sensitive region, laying time t, laying environmental temperature, as well as the differences of the selected orders in the polynomial fitting, the equation reached from the fitting could be different. Albeit they may have a certain degree of bias, they are able to reflect the relationship between Ic and $\Delta V$.

With a series of Ic and $\Delta V$ values, the equation Ic=f ($\Delta V$) can also be reached by fitting, so as to calculate the corresponding $\Delta V$ values of different Ic. In regard to the voltage measurement, it is easy to achieve the accuracy to ±1 mV, yet it is hard to achieve the accuracy to ±0.1 mV. The tiny changes of the factors such as testing environmental temperature, intensity of the probe contact, position of the probe contact, impact the testing data. In general, battery's $\Delta V$ value (accurate to ±1 mV) is within a definite range, the normal ones will be all listed, and the abnormal ones will be listed as the unqualified product.

The battery group of series connected n piece of battery cells, the difference between the smallest consumable current and the largest consumable current is the range of consumable current of battery cells $$\Delta Ic=Ic\max-Ic\min$$

In this way, the magnitudes of consumption rate and consumable current of various battery cells which have been charged to the fixed voltage point Vc and then laid aside for a time period t and thus are with different voltage decrease $\Delta V$, can be clearly obtained. In this way, the laying service life of the battery group can be calculated. And this can be used to configure the equalization current of the equalization protection board and the charging cut-off current of the charger.

The accomplishment of such basic work is helpful to understand the relationship of the values V0, Vt, $\Delta V$, Ic and $\Delta Ic$. And later on, the follow up work is quite simple: charge the battery cells to the Vc with constant current and constant voltage, measure and record the stable voltage V0, lay for time period t, measure and record voltage Vt, and then calculate the value of $\Delta V$.

$\Delta V$=(0, V1] being consumable current qualified $\Delta V$=(V2, V3] being consumable current at the same grade V1 has been used to control the max consumption of the battery group, which is correspondent to Ics; V2, V3 being used to control the max range of consumable current of the battery cells in the battery group, which is correspondent to the consumable current grade dividing h' WIcs, h'=(0, h] natural number; as for different $\Delta V$ grade, V2 and V3 can be different, selecting the battery cells with the same grade of their consumable currents to perform the matching, so as to control the range of consumable current of the battery group. The present invention employs the consumable current at the full charge state as the control standard, via the corresponding function relation, further uses the voltage difference as the measurement control value, so as to ensure the suitable laying service life of the matched battery group.

Testing and fitting the Ic–$\Delta V$ equation are the fundamental work, for a particular model system, such work only needs to be done once. In the production, coverts the grade divided according to the consumable current to the grade divided based on the voltage difference after laying, which is convenient and efficient. Utilize the bar code system of battery and the calculation function of excel, as long as the V0 and Vt have been measured and recorded, the $\Delta V$, Ic and the $\Delta Ic$ among individual battery cells within a matched battery group can all be calculated.

Select the voltage sensitive region with large voltage change in the discharge curve, then the battery cells are charged to a fixed point of voltage Vc within the selected voltage sensitive region with constant current and constant voltage, the battery cells being laid at room temperature for a time period t, then measuring a series of Ic values and $\Delta V$ values, fitting the Ic–$\Delta V$ equation, setting the qualified voltage difference and the grade level of voltage difference. The battery cells laying time t at the room temperature is 1~28 days. Next determine the grades of voltage difference according to the divided grades of the range of consumable current $\Delta Ic$. Yet the voltage grades are not necessarily to be an arithmetic progression.

For example, concerning a 10000 mAh to lithium iron phosphate battery, as shown in Table 2, after being charged to the fixed voltage point of 3.15 V, at room temperature with open circuit laying for 7 days, its $\Delta V$ are between 5~20 mV, and the calculated corresponding consumable currents are between 0.09~1.371 mA. Set the battery with its consumable current less than or equal to 1.371 mA as the qualified, Ics=1.371 mA, set W=0.333, and uses W Ics=0.457 mA as the grade span length, the divided grade levels are (0, 0.457], (0.457, 0.914], (0.914, 1.371]. By virtue of the conversion between the consumable current Ic and the voltage difference $\Delta V$, the actual operation would be the one with $\Delta V \leq 20$ mV as the qualified. The grade levels according to the voltage difference would be (0, 12], (12, 16], (16, 20]. And the voltage grades are not an arithmetic progression.

1.2 Dividing Grade Based on the Capacity:

setting a qualified capacity Cs, $C \geq Cs$ being the qualified; $Cs \geq C_5$, using XCs as the grade span length, X=0.01~0.1, grade levels being [Cs, (1+X) Cs), [(1+X) Cs, (1+2×) Cs), [(1+2×) Cs, (1+3×) Cs), . . . [(1+(i−1) X) Cs, (1+iX) Cs); number of grade I is related to the grade span length XCs and the size of the capacity distributions, generally $(1+iX) \leq 1.5$, $iX \leq 0.5$, $i \leq 0.5/X$.

For example, concerning a certain battery cell has a rated capacity as 10000 mAh, set the qualified capacity as ≥10000 mAh, Cs=10000 mAh, set X=0.02, the grade span length Xcs=200 mAh, and the qualified battery cell capacities are distributed within the range of 10000~10980 mAh, then the grade levels would be [10000, 10200), [10200, 10400), [10400, 10600), [10600, 10800), [10800, 11000).

1.3 Dividing Grade Based on the Internal Resistance

According to the design of the respective battery cell, set a qualified internal resistance Rs, $R \leq Rs$ being the qualified; using YRs as the grade span length, Y=0.05~0.5, grade levels being (0, YRs], (YRs, 2YRs], (2YRs, 3YRs], . . . ((j−1) YRs, jYRs]; jY=1, the number of grade j=1/Y; which is related to the sizes of grade span length YRs and the distribution of the internal resistance. Certain grade level set based on the theory may not exist in the reality.

For example, the qualified internal resistance of a battery cell Rs=10 mΩ. $R \leq Rs$ as the qualified, set Y=0.2, grade span length YRs=2 mΩ, and the battery cell internal resistances are distributed in the range of 5~10 mΩ. Then the divided grade levels would be (4, 6], (6, 8], (8, 10]. And the grade levels of (0, 2] and (2, 4] do not exist.

1.4 Dividing Grade Based on the Ratio of Constant Current

According to the design of the respective battery cell, set a qualified constant current ratio Ccs, $Cc \geq Ccs$ being the qualified; using ZCcs as the grade span length, Z=0.01~0.1, grade levels being [Ccs, (1+Z) Ccs), [(1+Z) Ccs, (1+2Z) Ccs), [(1+2Z)Ccs, (1+3Z)Ccs), . . . [(1+(k−1)Z)Ccs, (1+kZ) Ccs), (1+kZ)Ccs 1, $k \leq (1/Ccs−1)/Z$, the number of grade k is related to the sizes of the grade span length ZCcs and the distribution of the constant current ratio. Certain grade level set based on the theory may not exist in the reality.

For example, a certain battery cell has been set the constant current ratio Ccs=90%, $Cc \geq Ccs$ being the qualified, set Z=0.02, the grade span length Z Ccs=1.8%, the distribution of the battery cell the constant current ratios are 90~97.1%, the divided grade levels are [90%, 91.8%), [91.8%, 93.6%), [93.6%, 95.4%), [95.4%, 97.2%). And the grade level of [97.2%, 99%) does not exist.

Selecting the battery cells with consumable current and the voltage difference being qualified and in the same grade, capacity being qualified and in the same grade, internal resistance being qualified and in the same grade, ratio of constant current being qualified and in the same grade to perform the matching.

2. The configuration of the equalization protection board: the equalization current of the equalization protection board is 100~1000 fold of the range of consumable current that is used for battery matching design.

$$Ib=100\Delta Ic \sim 1000\Delta Ic$$

3. The configuration of the charger: the charger charging cut-off current should be 1~10 fold of the equalization current of the equalization protection board.

$$I\text{cut}=Ib \sim 10Ib$$

Embodiment 1

Model 11585135Fe lithium iron phosphate lithium ion battery produced by the company. Its nominal voltage is 3.2 V, rated capacity is 10 Ah. Based on the client's request, it has been made as battery group with 12 series connected cells, and need the matched protection board and charger. The client requires the laying service life to be more than 8 months. The end user needs to charge it from once per day to once per every 5 days; which both can charge the battery with equalization so as to function optimally.

Basic work: in regard to the system of Model 11585135Fe lithium iron phosphate lithium ion battery, its $0.2C_5$ discharge platform is quite flat, at the end of the discharging stage, SOC is between 0.3 and 0, the SOC variable quantity is 0.3. And its voltage drop is pretty quick, from 3.2 V drops to 2.00 V. We have selected the voltage section 2.00~3.00 V to conduct the testing, with selecting the fixed voltage point as 3.15 V. The battery cells have been charged with constant current and constant voltage to a certain fixed voltage point Vc=3.15 V of the selected voltage section, following laying with open circuit for 4 h, the voltage becomes stable, with the change rate of less than 1 mV per 1 h. Then measure and record the battery cell initial voltage as V0, conduct laying for a period of 7 days, measure and record the voltage V7, select the battery cells with $\Delta V=V0-V7=5, 6, 7, 8, 9, 10, 11, 12, 13, 14, 15, 16, 17, 18, 19, 20, 21, 22, 23, 24, 25$ mV:

1) $0.2C_5$ charge and discharge for 1 week, the discharge capacity is $C_5$;
2) $0.2C_5$ CC/CV 3.6 V, 1/20C charge to full;
3) laying for 28 days;
4) $0.2C_5$ CC 2V (discharge capacity $C_5'$)
5) calculating $C_5'/C_5$, which are the charge retention capabilities of the $\Delta V$ battery cells in each grade; $Ic=(C_5-C_5')/(24*28)$, which are the full charge state consumable current of the $\Delta V$ battery cells in each grade;

Using Ic to perform curve fitting to the $\Delta V$, so as to obtain the $Ic-\Delta V$ equation;

$$Ic=8*10^{-6}\Delta V^4-0.0006\Delta V^3+0.0188\Delta V^2-0.1546\Delta V+0.4634$$

Correlation coefficient $R^2=0.9992$

In regard to a battery group of n battery cells series connected, the range of consumable current is the difference between the max consumable current and the min consumable current:

$$\Delta Ic=Ic\max-Ic\min$$

In this way, it can be clearly known about the size of the consumption rate and consumable current of the battery cells with different voltage drops, after being charged to the fixed voltage point of 3.15 V and then laying for 7 days. The laying service life can be calculated. It can be configured with equalization protection board and charger.

TABLE 2

Battery Cells ΔV and the Corresponding Ic

| ΔV (mV) | Ic (mA) | Ic converted to $C_5$ (mA) |
|---|---|---|
| 5 | 0.090 | 0.000090 $C_5$ |
| 6 | 0.093 | 0.0000093 $C_5$ |
| 7 | 0.116 | 0.0000116 $C_5$ |
| 8 | 0.155 | 0.0000155 $C_5$ |
| 9 | 0.210 | 0.0000210 $C_5$ |
| 10 | 0.277 | 0.0000277 $C_5$ |
| 11 | 0.356 | 0.0000356 $C_5$ |
| 12 | 0.444 | 0.0000444 $C_5$ |
| 13 | 0.541 | 0.0000541 $C_5$ |
| 14 | 0.645 | 0.0000645 $C_5$ |
| 15 | 0.754 | 0.0000754 $C_5$ |
| 16 | 0.869 | 0.0000869 $C_5$ |
| 17 | 0.989 | 0.0000989 $C_5$ |
| 18 | 1.112 | 0.0001112 $C_5$ |
| 19 | 1.240 | 0.0001240 $C_5$ |
| 20 | 1.371 | 0.0001371 $C_5$ |

Based on the results from the basic work above and the actual condition of ΔV distribution, there is no battery cells in the range of ΔV≤4 mV, in the range of ΔV=[5, 6], only a few are useful, while in the range ΔV≥21 mV, only 1‰ battery cells have been discarded. In this project, the battery consumption rate has been controlled as less than 9.2%. Select the battery cells with ΔV≤20 mV as the qualified battery cells; and their consumable currents Ic are distributed within the range between 0.090~1.371 mA. The grades are divided based on the requirements set forth below:

1. Battery Grade Dividing and Battery Matching (1) grade dividing based on consumable current and voltage difference: the consumable current standard is set as Ics=1.371 mA, Ic≤Ics is the qualified one. Based on the client's requirement about the laying service life, it needs to control the range of consumable current of the battery cells within the same grade ΔIc less than $0.2C_5/(8*30*24)=0.00003478\ C_5$ mA=0.3478 $C_5$ mA; in design set W=0.25, grade span length WIcs=0.3428 mA, i.e., the designed range of consumable current of the battery cells within the same grade ΔIc=0.3428 mA, the grades dividing based on the consumable current is (0, 0.343], (0.343, 0.686], (0.686, 1.028], (1.028, 1.371]; Converted it to the voltage difference: set ΔV≤20 mV as the qualified, the grades divided according on the ΔV are, the first grade (0, 10], the second grade (10, 14], the third grade (14, 17], the fourth grade (17, 20]; a large number of the battery cells are within the range from the first grade to the third grade, and a small number are in the fourth grade;

(2) Grade dividing based on the capacity: the rated capacity is 10000 mAh, set the capacity standard as Cs=10000 mAh, C≥Cs as the qualified. Set X=0.05, the grade span length XCs=500 mAh; the actual capacities are distributed in the range from 10000~10999 mAh, the grades dividing based on the capacity are the first grade [10000, 10500), the second grade [10500, 11000];

(3) The internal resistance is not divided into grades: set the internal resistance standard Rs=5 mΩ, R≤Rs as the qualified;

(4) Constant current ratio is not divided into grades: set the constant current ratio standard Ccs=90%, Cc≥Ccs as the qualified;

Sample data are shown in Table 3;

TABLE 3

Parameters for Battery Cells Matching

| No. | Capacity [mAh] | Internal resistance [mΩ] | Constant Current Ratio [%] | Voltage [V] | ΔV after 7 days [mV] | Consumable Current Ic [mA] |
|---|---|---|---|---|---|---|
| A1 | 10281 | 4 | 92 | 3.132 | 19 | 1.240 |
| A2 | 10253 | 4 | 93 | 3.131 | 18 | 1.112 |
| A3 | 10225 | 4 | 93 | 3.132 | 17 | 0.989 |
| A4 | 10212 | 3 | 92 | 3.134 | 19 | 1.240 |
| A5 | 10253 | 4 | 93 | 3.126 | 20 | 1.371 |
| A6 | 10233 | 4 | 94 | 3.128 | 18 | 1.112 |
| A7 | 10262 | 4 | 93 | 3.131 | 18 | 1.112 |
| A8 | 10268 | 3 | 93 | 3.133 | 17 | 0.989 |
| A9 | 10249 | 4 | 93 | 3.125 | 20 | 1.371 |
| A10 | 10218 | 4 | 92 | 3.130 | 18 | 1.112 |
| A11 | 10262 | 4 | 94 | 3.129 | 19 | 1.240 |
| A12 | 10222 | 4 | 93 | 3.128 | 18 | 1.112 |

ΔV qualified are all in the fourth grade, capacity qualified are all in the first grade, internal resistance qualified and constant current ration qualified, so as to match the battery cells;

2. Equalization protection board configuration: in design battery group ΔIc=0.3428 mA;

Select the equalization protection board with its equalization current as Ib=90 mA, Ib/ΔIc=262 fold; the equalization charge period is about 5 days;

3. Charger configuration: select 43.8 V/2 A charger, rated charging voltage is 43.8±0.2 V, rated charging current is 2 A, red light turned to green light charging cut-off current Icut=200 mA, Icut/Ib=2.2 Fold.

4. Verification

After assembled, the battery group is charge and discharge with 0.5C for 1 week. Discharge capacity is 10208 mAh, charged to the full state, being laid with open circuit till the voltage becomes stable; then measure and record voltage; lay for 5 days and then measure record voltage again. Charge the battery group, measure and record the stable voltage after the equalization charging. Next discharge it, the discharge capacity being 10200 mAh. Data are shown in Table 4, the discharge capacity after equalization charging is greater than the rated capacity.

TABLE 4

Voltages Before and After Laying and the Voltage After Equalization Charge

| No. | Voltage before laying with full charge [V] | Voltage after laying for 5 days [V] | Voltage after equalization charge [V] |
|---|---|---|---|
| A1 | 3.335 | 3.335 | 3.336 |
| A2 | 3.337 | 3.336 | 3.336 |
| A3 | 3.334 | 3.334 | 3.337 |
| A4 | 3.336 | 3.335 | 3.336 |
| A5 | 2.334 | 2.334 | 2.335 |
| A6 | 3.335 | 3.334 | 3.335 |
| A7 | 3.333 | 3.333 | 3.335 |
| A8 | 3.336 | 3.335 | 3.336 |
| A9 | 3.333 | 3.332 | 3.333 |
| A10 | 3.335 | 3.334 | 3.335 |
| A11 | 3.337 | 3.336 | 3.337 |
| A12 | 3.336 | 3.335 | 3.335 |

The implementation methods are not limited to the foregoing examples, as long as applying the principle of the present invention to conduct lithium secondary battery equalization matching and the formed battery system, such as increase the unnecessary charge or discharge operation on purpose, or increase the unnecessary temperature treatment, all within the claimed scope of the present invention.

The invention claimed is:
1. A method for equalizing and matching lithium secondary battery, using consumable current as control standard, via the corresponding function relation, using voltage difference as measurement control value, and selecting a battery cell at a grade of the consumable current the same as that of the voltage difference for matching, wherein:
   based on magnitude of the consumable current Ic to divide into more than one grades, number of grades being h, based on the size of the voltage difference $\Delta V$ to divide grades that are corresponding to the grades of the consumable current, selecting a battery cell at a grade of the consumable current the same as that of the voltage difference for matching, so as to control the range of consumable current of the battery group;
   Ic—consumable current, unit mA, the consumable current being calculated based on the measured consumption rate of a battery cell at the state of full charge and being laid aside for 28 days at room temperature;
   $\Delta V$—voltage difference, unit mV, the difference of the stable voltage V0 after a fixed voltage point charge and the voltage after a laying period of time t post the fixed voltage point charge Vt, t=1.about.28 days, $\Delta V$=V0−Vt;
   V0—the stable voltage after the fixed voltage point charge, unit mV, after the fixed voltage point charge, battery being laid aside as open circuit, the voltage being measured and recorded once for every hour; if the difference of the values from two consecutive measurements being less than 1 mV, then it being considered as the stable voltage; and
   Vt—the voltage after the laying of a set laying time period post the fixed voltage point charge, unit mV.
2. The method for equalizing and matching lithium secondary battery as set forth in claim 1, wherein:
   grade dividing according to the magnitude of consumable current, setting the qualified consumable current as Ics, and Ic≤Ics being the qualified, using WIcs as the grade span length, W=0.05~0.5, grade levels being (0, WIcs], (WIcs, 2 WIcs], (2WIcs, 3 WIcs], . . . ((h−1) WIcs, h WIcs], hW=1, number of grade h=1/W; Ics≤0.0002232$C_5$, which being equal to that the battery cell with its consumption rate less than or equal to 15% as the consumable current qualified;
   range of consumable current in the same grade $\Delta$Ic=WIcs;
   $\Delta$Ic—range of consumable current, with the unit as mA, the consumable currents measured after laying for 28 days with full state charge and at room temperature, of the battery cells in the same battery group, then calculating the respective consumable currents, the range of the consumable current being the difference between the max value and the min value;
   Ics—the set consumable current standard, unit mA;
   W—coefficient of consumable current grade dividing, no unit;
   h—grade number of consumable current grade dividing, no unit;
   Ic—consumable current, unit mA, the consumable current calculated based on the measured self-consumption rate of a battery cell after being laid aside with full charge for 28 days at room temperature; and
   grade dividing according to the voltage difference $\Delta V$, the battery cells being charged to a fixed point of voltage Vc within the selected voltage sensitive region with constant current and constant voltage, the battery cells being laid at room temperature for a time period t, then measuring a series of Ic values and $\Delta V$ values, determining the grades of voltage difference according to the divided grades of the consumable current $\Delta$Ic, battery cells laying time t at the room temperature being 1~28 days.
3. The method for equalizing and matching lithium secondary battery as set forth in claim 1, wherein:
   grade dividing according to the magnitude of consumable current, setting the qualified consumable current as Ics, and Ic≤Ics being the qualified, using WIcs as the grade span length, W=0.05~0.5, grade levels being (0, WIcs], (WIcs, 2 WIcs], (2WIcs, 3 WIcs], . . . ((h−1) WIcs, h WIcs], hW=1, number of grade h=1/W; Ics≤0.0002232$C_5$, which being equal to that the battery cell with its consumption rate less than or equal to 15% as the consumable current qualified;
   range of consumable current in the same grade $\Delta$Ic=WIcs;
   $\Delta$Ic—range of consumable current, unit mA, the consumable currents measured after 28 days of laying at the state of full charge and at room temperature, of the battery cells in the same battery group, then calculating the respective consumable currents, the range of the consumable current being the difference between the max value and the min value;
   Ics—the set consumable current standard, unit mA;
   W—coefficient of consumable current grade dividing, no unit;
   h—grade number of consumable current grade dividing, no unit;
   Ic—consumable current, unit mA, the consumable current calculated based on the measured self-consumption rate of a battery cell with full charge being laid aside for 28 days at room temperature;
   grade dividing according to the voltage difference $\Delta V$, the battery cells being charged to a fixed point of voltage Vc within the selected voltage sensitive region with constant current and constant voltage, the battery cells being laid with open circuit at room temperature, measuring and recording the voltage value once per hour, until the voltage difference between two consecutive measures being less than 1 mV, and using it as the battery cell laying initiation voltage V0, at room temperature laying a suitable time period t, t=1~28 days, measuring the voltage Vt again, and the $\Delta V$ after being laid for the time period t;
   measuring battery cells with different $\Delta V$, and its corresponding relationship with the consumable current at the state of full charge Ic, and then fitting the Ic-$\Delta V$ equation;

$$Ic=f(\Delta V)$$

fitting it until the correlation coefficient $R^2$≥0.99, so as to fit out the Ic-$\Delta V$ equation;
   charging battery cells with constant current and constant voltage to Vc, measuring and recording the stable voltage V0, laying time t, measuring and recording the voltage Vt, calculating the $\Delta V$;
   $\Delta V$=(0, V1] being consumable current qualified;
   $\Delta V$=(V2, V3] being consumable current within the same grade; and
   V1 being used to control the max consumable current of the battery group, which is correspondent to Ics; V2, V3 being used to control the max range of consumable current of the battery cells in the battery group, which is correspondent to the consumable current grade dividing h' WIcs, h'=(0, h] natural number; as for different grades of $\Delta V$, V2 and V3 can be different, selecting the battery cells with the same grade of their consumable currents to perform the matching, so as to control the range of consumable current of the battery group.

4. The method for equalizing and matching lithium secondary battery as set forth in claim 3, wherein:

grade dividing based on battery capacity, setting a qualified capacity Cs, C≥Cs being the qualified; Cs≥$C_5$, using XCs as the grade span length, X=0.01~0.1, grade levels being [Cs, (1+X) Cs], [(1+X) Cs, (1+2.times.) Cs], [(1+2.times.) Cs, (1+3.times.) Cs], . . . [(1+(i−1) X) Cs, (1+iX) Cs); number of grade is being related to the grade span length XCs and the size of the capacity distribution, generally (1+iX).1toreq.1.5, iX.1toreq.0.5, iltoreq.0.5/X.

5. The method for equalizing and matching lithium secondary battery as set forth in claim 3, wherein:

grade dividing based on internal resistance, setting a qualified internal resistance Rs, R≤Rs being the qualified; using YRs as the grade span length, Y=0.05~0.5, grade levels being (0, YRs], (YRs, 2YRs], (2YRs, 3YRs], . . . ((j−1) YRs, jYRs]; jY=1, the number of grade j=1/Y.

6. The method for equalizing and matching lithium secondary battery as set forth in claim 3, wherein:

grade dividing based on constant current ratio, setting a qualified constant current ratio Ccs, Cc≥Ccs being the qualified; using ZCcs as the grade span length, Z=0.01~0.1, grade levels being [Ccs, (1+Z) Ccs], [(1+Z) Ccs, (1+2Z) Ccs), [(1+2Z) Ccs, (1+3Z) Ccs), . . . [(1+(k−1)Z)Ccs, (1+kZ)Ccs), (1+kZ) Ccs≤1, k≤(1/Ccs−1)/Z, the number of grade being k.

7. A system for equalizing and matching lithium secondary battery, comprises lithium secondary battery group, equalization protection board, charger, wherein: the lithium secondary battery using the full charge state consumable current magnitude as the control standard, via the corresponding function relation, using the voltage difference as measurement control value, selecting the battery cell with a grade the same as of the consumable current being the same and the voltage difference to conducting the battery matching, wherein:

grade dividing for the lithium secondary battery, according the magnitude of the consumable current Ic dividing the battery cell into more than one grades, the number of grade being h, according the size of the voltage difference ΔV dividing the battery cell dividing the battery cell into grades that corresponding to the consumable current, selecting the battery cells that have the same grates of consumable current and voltage difference to conduct the matching, so the range of the consumable current of the battery group can be controlled;

Ic—consumable current, unit mA, the consumable current calculated based on the measured consumption rate of a battery cell at the state of full charge and being laid aside for 28 days at room temperature;

ΔV—voltage difference; unit is mV, the difference of the stable voltage V0 after the fixed voltage point charge and the voltage Vt after the laying of time t post the fixed voltage charge, t=1.about.28 days, .about.V=V0−Vt;

V0—the stable voltage after the fixed voltage charge, unit mV, after the fixed voltage charge, laying battery as open circuit, the voltage will be measured and recorded once for every hour, if the difference of the values from two consecutive measurements is less than 1 mV, then it being considered as the stable voltage;

Vt—the voltage after the laying of a set laying time period t post the fixed voltage charging, unit mV;

grade dividing according to the consumable current, setting the qualified consumable current as Ics, and Ic≤Ics being the qualified, using WIcs as the grade span length, W=0.05~0.5, grade levels being (0, WIcs], (WIcs, 2 WIcs], (2WIcs, 3 WIcs], . . . ((h−1) WIcs, h WIcs], h W=1, number of grade h=1/W; Ics<0.0002232$C_5$, which being equal to that the battery cell with its consumption rate less than or equal to 15% as the consumable current qualified;

range of consumable current of the same grade ΔIc=WIcs;

ΔIc—range of consumable current, with unit as mA, the consumable currents measured after 28 days of laying with the state of full charge and at room temperature, of the battery cells in the same battery group, then calculating the respective consumable currents, the range of the consumable current being the difference between the max value and the min value;

Ics—the set consumable current standard, unit mA,

W—coefficient of consumable current grade dividing, no unit;

h—grade number of consumable current grade dividing, no unit;

Ic—consumable current, unit mA, the consumable current calculated based on the measured self-consumption rate of a battery cell with full charge being laid aside for 28 days at room temperature;

the grade dividing according to the voltage difference ΔV, the battery cells being charged to a fixed point of voltage Vc within the selected voltage sensitive region with constant current and constant voltage, the battery cells being laid with open circuit at room temperature, measuring and recording the voltage value once for each hour, until the voltage difference between two consecutive measurement being less than 1 mV, and using it as the battery cell laying initiation voltage V0, at room temperature laying a suitable time period t, t=1~28 days, measuring the voltage Vt again, and the ΔV after being laid for the time period measuring battery cells with different ΔV, and its corresponding relationship with the consumable current at the state of full charge Ic, and then fitting the Ic-ΔV equation;

$$Ic=f(\Delta V)$$

fitting it until the correlation coefficient $R^2$≥0.99, so as to fit out the Ic−ΔV equation;

charging battery cells with constant current and constant voltage to Vc, measuring and recording the stable voltage V0, laying time t, measuring and recording the voltage Vt, calculating the ΔV;

ΔV=(0, V1] being consumable current qualified;

ΔV=(V2, V3] being consumable current within the same grade;

V1 being used to control the max consumable current of the battery group, which is correspondent to Ics; V2, V3 being used to control the max range of consumable current of the battery cells in the battery group, which is correspondent to the consumable current grade dividing h' WIcs, h'=(0, hi natural number; as for different ΔV, V2 and V3 can be different, selecting the battery cells with the same grade of their consumable currents to perform the matching, so as to control the range of consumable current of the battery group;

the equalization current of the equalization protection board being 100~1000 fold of the range of consumable current used for the battery cell matching design, Ib=ΔIc~1000 ΔIc; and the charge cut-off current of the charger being 1~10 fold of the equalization current of the equalization protection board, Icut=Ib~10 Ib.

8. The system for equalizing and matching lithium secondary battery as set forth in claim 7, wherein:

grade dividing for the lithium secondary battery, according the magnitude of the consumable current Ic dividing the battery cell into more than one grades, the number of grade being h, according the size of the voltage difference ΔV dividing the battery cell dividing the battery cell into grades that corresponding to the consumable current, selecting the battery cells that have the same grades of consumable current and voltage difference to conduct battery matching, so the range of the consumable current of the battery group can be controlled;

Ic—consumable current, unit mA, the consumable current calculated based on the measured consumption rate of a battery cell at the state of full charge and being laid aside for 28 days at room temperature;

ΔV—voltage difference; unit mV, the difference of the stable voltage V0 after the fixed voltage point charge and the voltage Vt after the laying of time t post the fixed voltage charge, t=7 days, ΔV=V0-Vt;

V0—the stable voltage after the fixed voltage charge, unit mV, after the fixed voltage charge, it is laid aside as the open circuit, the voltage will be measured and recorded once for every hour, if the difference of the values from two consecutive measurements being less than 1 mV, then it will be considered as the stable voltage;

Vt—the voltage after the laying of t=7 days post the fixed voltage charging, unit mV; grade dividing according to the consumable current, setting the qualified consumable current as Ics, and Ic≤Ics being the qualified, using WIcs as the grade span length, W=0.2~0.3, grade levels being (0, WIcs], (WIcs, 2 WIcs], (2WIcs, 3 WIcs], . . . ((h−1) WIcs, h WIcs], h W=1, number of grade h=1/W; Ics<0.0002232$C_5$, which being equal to that the battery cell with its consumption rate less than or equal to 15% as the consumable current qualified; range of consumable current of the same grade ΔIc=WIcs;

ΔIc—range of consumable current, unit mA, the consumable currents measured after 28 days of laying with the state of full charge and at room temperature, of the battery cells in the same battery group, then calculating the respective consumable currents, the range of the consumable current being the difference between the max value and the min value;

Ics—the set consumable current standard, unit mA;

W—coefficient of consumable current grade dividing, no unit;

h—grade number of consumable current grade dividing, no unit;

Ic—consumable current, unit mA, the consumable current calculated based on the measured self-consumption rate of a battery cell with full charge being laid aside for 28 days at room temperature;

grade dividing according to the voltage difference ΔV, the battery cells being charged to a fixed point of voltage Vc within the selected voltage sensitive region with constant current and constant voltage, the battery cells being laid with open circuit at room temperature, measuring and recording the voltage value once for each hour, until the voltage difference between two consecutive measures being less than 1 mV, and using it as the battery cell laying initiation voltage V0, at room temperature laying a suitable time period t, t=7 days, measuring the voltage Vt again, and the ΔV after being laid for the time period t=7 days;

measuring battery cells with different ΔV, and its corresponding relationship with the consumable current at the state of full charge Ic, and then fitting the Ic-ΔV equation;

$$Ic=f(\Delta V)$$

fitting it until the correlation coefficient $R^2 \geq 0.99$, so as to fit out the Ic-ΔV equation;

charging battery cells with constant current and constant voltage to Vc, measuring and recording the stable voltage V0, laying time t, measuring and recording the voltage Vt, calculating the ΔV;

ΔV=(0, V1] being consumable current qualified;

ΔV=(V2, V3] being consumable current within the same grade;

V1 being used to control the max consumable current of the battery group, which is correspondent to Ics; V2, V3 being used to control the max range of consumable current of the battery cells in the battery group, which is correspondent to the consumable current grade dividing h' WIcs, h'=(0, h] natural number; as for different ΔV, V2 and V3 can be different, selecting the battery cells with the same grade of their consumable currents to perform the matching, so as to control the range of consumable current of the battery group;

dividing the grades based on battery capacity: setting a qualified capacity Cs, C≥Cs being the qualified; Cs≥$C_5$, using XCs as the grade span length, X=0.02~0.05, grade levels being [Cs, (1+X)Cs), [(1+X)Cs, (1+2X) Cs), [(1+2X)Cs, (1+3.times.) Cs), . . . [(1+(i−1) X) Cs, (1+iX) Cs); number of grade i is related to the grade span length XCs and the size of the capacity distributions, generally (1+iX)≤1.5, iX≤0.5, i≤0.5/X;

internal resistance is not divided to different grades, setting a qualified internal resistance Rs, R≤Rs being the qualified;

constant current ratio is not divided to different grades, setting a qualified constant current ratio Ccs, Cc≥Ccs being the qualified;

the equalization current of the equalization protection board being 200.about.500 fold of the range of consumable current used for the battery cell matching design, Ib=200 .DELTA.Ic.about.500 ΔIc; and charge cut-off current of the charger being 2~5 fold of the equalization current of the equalization protection board, Icut=2 Ib~5 Ib.

* * * * *

UNITED STATES PATENT AND TRADEMARK OFFICE
CERTIFICATE OF CORRECTION

PATENT NO.      : 9,577,293 B2                                Page 1 of 1
APPLICATION NO. : 14/113287
DATED           : February 21, 2017
INVENTOR(S)     : Tang et al.

It is certified that error appears in the above-identified patent and that said Letters Patent is hereby corrected as shown below:

In the Claims

Column 22, Line 42: Claim 7, Delete "period measuring" and insert -- period t; measuring --

Column 22, Line 63: Claim 7, Delete "h' WIcs, h'=(0, hi natural number;" and insert
-- h' WIcs, h'=(0, h] natural number; --

Signed and Sealed this
Thirtieth Day of May, 2017

Michelle K. Lee
*Director of the United States Patent and Trademark Office*